R. R. CRAFT.
DEMOUNTABLE RIM AND LOCK THEREFOR FOR WHEELS.
APPLICATION FILED AUG. 25, 1919.
1,338,072.
Patented Apr. 27, 1920.
2 SHEETS—SHEET 2.
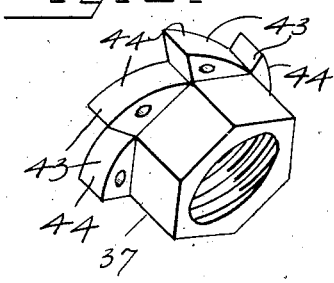
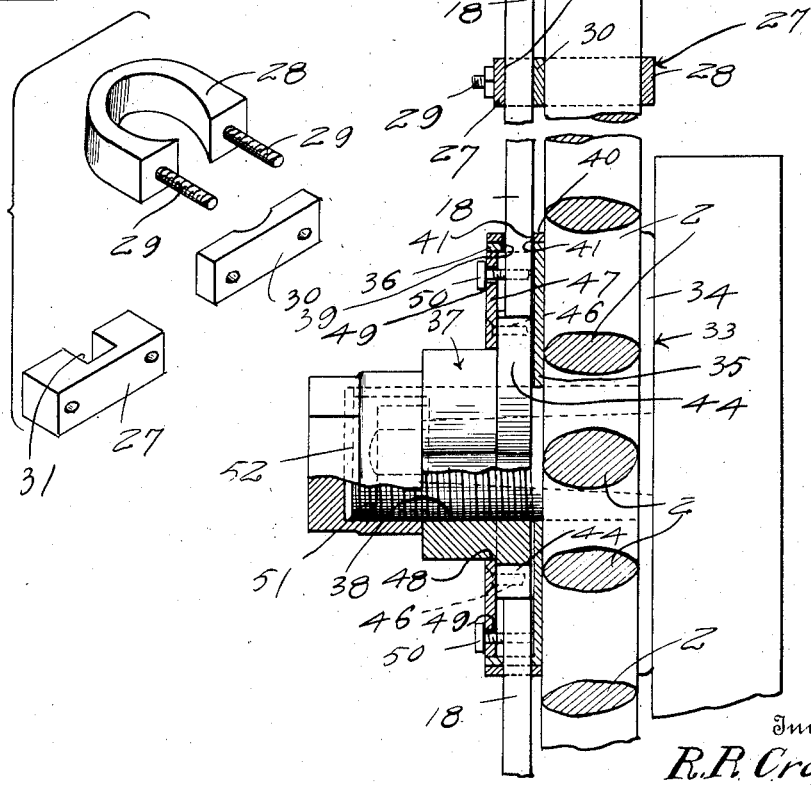
Inventor
R. R. Craft
By Watson E. Coleman
Attorney

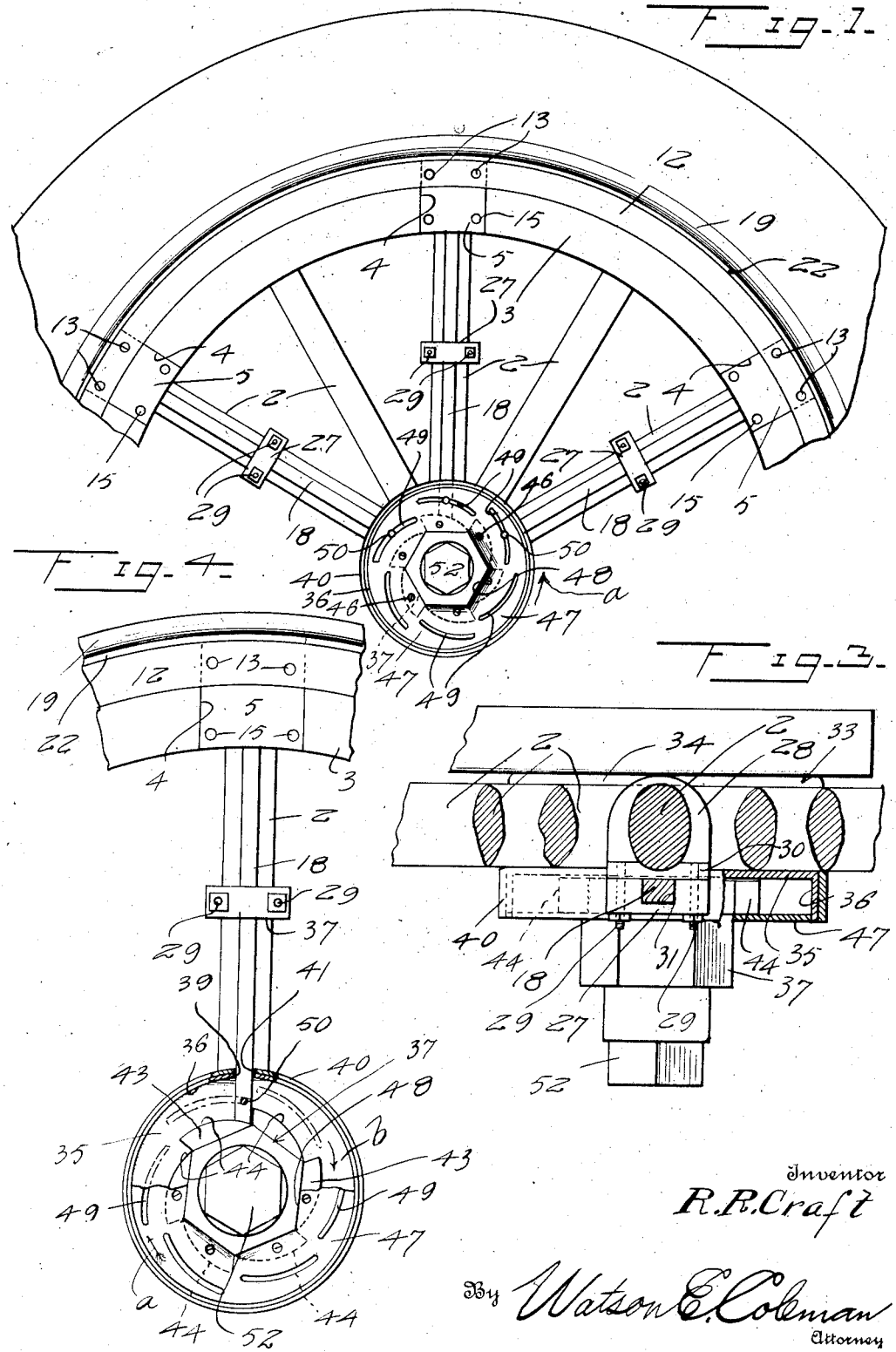

UNITED STATES PATENT OFFICE.

RUSSELL R. CRAFT, OF NORFOLK, NEBRASKA.

DEMOUNTABLE RIM AND LOCK THEREFOR FOR WHEELS.

1,338,072.  Specification of Letters Patent.  Patented Apr. 27, 1920.

Application filed August 25, 1919. Serial No. 319,580.

*To all whom it may concern:*

Be it known that I, RUSSELL R. CRAFT, a citizen of the United States, residing at Norfolk, in the county of Madison and State of Nebraska, have invented certain new and useful Improvements in Demountable Rims and Locks Therefor for Wheels, of which the following is a specification, reference being had to the accompanying drawings.

This invention relates to demountable rims for wheels, and particularly to an improved lock therefor, and an object of the invention is to provide a locking mechanism on a wheel to facilitate the attachment and removal of the rim to and from the wheel.

A further object of the invention is the provision of means carried by certain of the spokes of the wheel, say for instance every other spoke, though not necessarily, cam controlled, in combination with means threaded upon the hub of the wheel and carrying the controlling means for actuating the locking members simultaneously, to cause the outer ends of the locking members to simultaneously engage depressions or recesses in a keeper plate on the rim to retain the rim securely on the wheel.

A further object of the invention is to provide a locking mechanism on the wheel, that is the spokes thereof, to detachably lock the demountable rim on the wheel, thus eliminating the necessity of manually securing and detaching a series of clamps, which are ordinarily employed in the fastening of a demountable rim upon the wheel, said locking mechanism including a single actuator for forcing the locking members radially of the wheel, to engage the keeper plate of the demountable rim to fasten the rim in position.

A further object of the invention is to provide means carried by a felly engaging band, for retaining the guide (through which the locking members pass) securely to and embedded in the side of the felly of the wheel, to avoid wear on the wood felly.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a segment of a wheel illustrating several spokes, and showing the improved demountable rim locking device as applied to certain of the spokes, say for instance every other spoke.

Fig. 2 is a sectional view on line 2—2 of Fig. 1.

Fig. 3 is an enlarged detail cross-sectional view on line 3—3 of Fig. 1 looking downwardly and illustrating the locking member actuator, which is threaded upon the hub of the wheel.

Fig. 4 is an enlarged detail view in side elevation of one of the spokes of the wheel, showing a single locking member, and illustrating the actuator as having been moved, whereby one of its shoulders is in engagement with one end of the locking member, to prevent unscrewing of the actuator, and also illustrating the casing, which incloses the cam portions of the actuator, in section.

Fig. 5 is an enlarged detail view in perspective of the single actuator to be threaded upon the hub for actuating the locking members radially of the wheel.

Fig. 6 is a detail view of one of the guides for the medial portions of the locking members.

Referring more especially to the drawings, 1 designates the usual construction of hub for automobile wheels, 2 the spokes, and 3 denotes the felly.

At spaced intervals and adjacent the outer end portions of every other spoke, though not necessarily, one side of the felly is provided with recesses 4, for the reception of guide plates or blocks 5. These guide plates or blocks are provided with radial openings 6, and the outer faces of the guide plates or blocks are recessed as shown at 7.

Mounted upon the felly of the wheel is a felly band 8, one side edge of which has an upturned flange 9, which is shaped, as shown at 10 to properly conform to one side of the automobile rim 11. The other side edge portion of the felly band 8 has an annular flange 12, which extends radially inwardly of the wheel. This flange 12 overlies the blocks or guide plates 5, and engages their recesses 7, thereby assisting in retaining the guide blocks or plates in the recess 4 of the felly. Bolts 13 pass transversely of the felly of the wheel and through the radial flange 12, and are provided with nuts 14 to hold them in place, thereby securing the felly band in position. Additional bolts 15 pass through the guide plates or blocks 5, and transversely through the felly, and are provided with nuts 16, thereby additionally securing the guide plates or blocks in position. The bolts 13 also pass through the guide plates or blocks.

The guide plates or blocks are provided with guide openings 17, for the reception of the outer end portions of the radial locking members or bolts 18.

Mounted upon the felly band is a demountable rim 19, which has tire engaging flanges 20. Preferably, the flanges 20 may be of the clencher type, though not necessarily, for it is obvious they may be otherwise shaped, so as to engage corresponding flanges of the tire 21, which is carried upon the demountable rim. The under face of the demountable rim has secured thereto in any suitable manner an annular keeper plate 22, which is provided with recesses or openings 23. These openings or recesses 23 are arranged coincident to the locking members 18, and are constructed correspondingly to the ends 24 of the locking members. In other words, the recesses 23 have beveled walls 25, which are engaged by the beveled portions 24 of the locking members, thereby tending to force the demountable rim toward the retaining flange 9 of the felly band, thus acting to withstand the weight more generally over the surface of the felly, that is when the locking members are moved radially outwardly.

As previously stated, the locking members are arranged adjacent every other spoke of the wheel, and are mounted in additional guides 27, which are carried by the spokes substantially midway their ends. Each guide 27 consists of a U-shaped strap 28, which straddles the spoke and its arms are provided with threaded extensions 29. The extensions 29 pass through the clamping plate 30, which is opposed to the U-shaped strap 28, and also to the end portions of the guides 27. The guide 27 has a rectangular recess 31, to which the locking member or bolt (which is correspondingly shaped in cross-section) passes. Suitable nuts 32 are secured upon the extensions 29, to hold the guide 27 in place.

The hub 33 of the wheel comprises the opposing plates 34 and 35. The plate 34 is disposed adjacent the inner face of the wheel, and is circular, whereas the plate 35 is disposed adjacent the exterior face of the wheel. The plate 35 is provided with a marginal flange 36, which converts the plate into substantially a cup or housing for the locking member actuator 37. In fact, the actuator 37 is threaded upon the hub, as indicated at 38, and which hub forms a part of the plate 34, as indicated in dotted lines. The annular flange 36 has guide openings 39, in which the inner ends of the locking members or bolts 18 are guided. An annular band 40 also engages about the flange 36, to additionally reinforce the same, and has guide openings 41, and through which the inner end portions of the locking members or bolts 18 pass.

The actuator 37 comprises a hexagon body preferably, though not necessarily, for it is obvious that the body may be shaped otherwise polygonally. The actuator also has a plurality of projections 43, arranged at intervals, incident to the inner ends of the locking members or bolts. These projections 43 have curved cam projections 44, each of which is eccentric to the center of the actuator. The inner ends of the locking members or bolts engage the curved cam surfaces 44, so that when the actuator is rotated in one direction, say for instance in the direction of the arrow $a$, the locking members or bolts will be moved outwardly, so that their beveled outer ends will engage the recesses or openings 23 of the keeper plate, thereby locking the demountable rim securely on the felly band. When the actuator is moved in the opposite direction, say for instance as indicated by the arrow $b$, the locking members or bolts will move radially inwardly toward the center of the hub of the wheel, thereby withdrawing their beveled ends from engagement with the recesses 23 of the keeper plate, sufficiently to permit the demountable rim to be easily removed. The inner ends of the locking members, when the actuator is moved in this latter direction, will abut the shoulders 45, which are caused to be formed by the projections 43, thereby preventing further movement of the actuator. These shoulders 45 are afforded by the radial ends of the projections 43. Secured by screws 46 to the projection 43 is a plate 47. This plate is provided with an opening 48, which is shaped correspondingly to the body of the actuator, preferably hexagonal or any other polygonal shape, so as to assist in holding the plate 47 in place, in fact, preventing turning of the plate. The circular plate 47 is provided with a plurality of arcuate slots 49, which are concentric with the curved cam faces 44 of the projections 43. Extending through the slot 49 and threaded into the inner ends of the locking members or bolts 18 are the headed screws 50. Obviously when the actuator is rotated in one direction or the other, the locking members or bolts will be moved radially of the wheel, either radially inwardly, or radially outwardly, it depending entirely upon the direction of rotation of the actuator. Obviously, the cam faces 44 will move the locking members outwardly, so that their outer ends will engage the recesses 23, and when rotated in the opposite direction, the slots will act upon the headed pins 50 and move the locking members inwardly radially of the wheel, so as to disengage their outer ends from the recesses 23 of the keeper plate.

Threaded upon the hub as indicated at 51 is a hub cap 52, which is screwed home closely in contact with the body of the actuator, thereby more securely retaining the actuator in place, in fact acting as a jam locking nut for the actuator. By means of the guides including those midway of the ends of the spokes, those adjacent the hub of the wheel and the felly thereof, the locking members may be easily and quickly detached from the spokes. Furthermore, by means of this improved actuating mechanism for the locking members or bolts, a demountable rim may be easily and quickly removed. Furthermore, when the locking members or bolts are moved radially outwardly, causing their beveled ends to engage the recesses 23 of the keeper plate, the demountable rim is forced toward the retaining flange 9 of the felly band, thus tending to equalize the weight more generally over the surface of the felly.

The invention having been set forth, what is claimed as new and useful is:

1. The combination with a wheel having a felly and a demountable rim thereon, of an annular keeper plate secured to the inner face of the rim and provided with recesses, a plurality of locking members carried by the spokes of the wheel, whereby their outer ends may engage the recesses of the keeper plate, and a single actuator rotatably carried by the hub of the wheel and provided with cam connections with the locking members for moving them radially outwardly, so that their outer ends may engage the recesses of the keeper plate, or move radially inwardly, to disengage the outer ends of the locking members from the recesses, whereby the demountable rim may be removed.

2. The combination with a wheel having a felly and a demountable rim thereon, of an annular keeper plate secured to the inner face of the rim and provided with recesses, a plurality of locking members carried by the spokes of the wheel, whereby their outer ends may engage the recesses of the keeper plate, and a single actuator rotatably carried by the hub of the wheel and provided with cam connections with the locking members for moving them radially outwardly, so that their outer ends may engage the recesses of the keeper plate, or move radially inwardly, to disengage the outer ends of the locking members from the recesses, whereby the demountable rim may be removed, said cam connections including means to prevent the actuator from being entirely removed from the hub of the wheel.

3. The combination with a wheel having a felly provided with a felly band and a demountable rim surrounding the band, said felly band having an inner retaining flange, said demountable rim having an annular keeper plate provided with beveled recesses, of a plurality of locking members carried by certain of the spokes of the wheel and having their outer ends beveled adapted to enter said recesses of the keeper plate so as to coöperate with the beveled portions of the recesses to keep the demountable rim in contact with the retaining flange of the felly band, and means rotatably carried by the hub of the wheel for actuating the locking members, to lock or unlock the demountable rim.

4. The combination with a wheel having a felly, of a felly band mounted on the felly of the wheel and having an inner retaining flange, guides arranged adjacent the outer face of the felly by the felly band, said felly band having means to retain the guides in position, a demountable rim having a keeper plate and being mounted upon the felly band, said keeper plate having recesses provided with beveled faces, locking members mounted in said guides and having their outer ends beveled, coöperating with the bevel of the recesses, to keep the demountable rim in contact with the inner retaining flange, the spokes and the hub of the wheel having guides for the locking members, and means rotatably carried by the hub and having operative connections with the locking members for moving them in and out of engagement with the recesses of the keeper plate.

5. The combination with a wheel having a felly and a demountable rim thereon provided with keeper means, of a plurality of locking members carried by certain of the spokes of the wheel and having their outer ends adapted to engage the keeper means, a housing carried by the hub of the wheel, in which the locking members are radially guided, a single locking member actuator rotatably carried by the hub of the wheel and having a portion mounted in the housing, said portion of the actuator which is mounted in the housing having cam members to be engaged by the inner ends of the locking members, a plate carried by the portion having the cam members and provided with curved slots concentric with the cam members, and means engaging said slots and carried by the inner ends of the locking members, so that together with the cam members, the locking members may be moved radially to engage and disengage the keeper means of the demountable rim.

6. The combination with a wheel having a felly and a demountable rim thereon provided with keeper means, of a plurality of locking members carried by certain of the spokes of the wheel and having their outer ends adapted to engage the keeper means, a housing carried by the hub of the wheel, in which the locking members are radially guided, a single locking member actuator rotatably carried by the hub of the wheel and having a portion mounted in the housing, said portion of the actuator which is mounted in the housing having cam members to be engaged by the inner ends of the locking members, a plate carried by the portion having the cam members and provided with curved slots concentric with the cam members, means engaging said slots and carried by the inner ends of the locking members, so that together with the cam members, the locking members may be moved radially to engage and disengage the keeper means of the demountable rim, guides carried by the spokes for the locking members, and means threaded upon the hub of the wheel for retaining the single actuator in place.

In testimony whereof I hereunto affix my signature.

RUSSELL R. CRAFT.